Oct. 18, 1960 T. R. DUNCAN 2,956,466
DRIVE AND GUIDING MEANS FOR DISK ACTUATED MUSIC COMB
Filed July 22, 1955 3 Sheets-Sheet 1
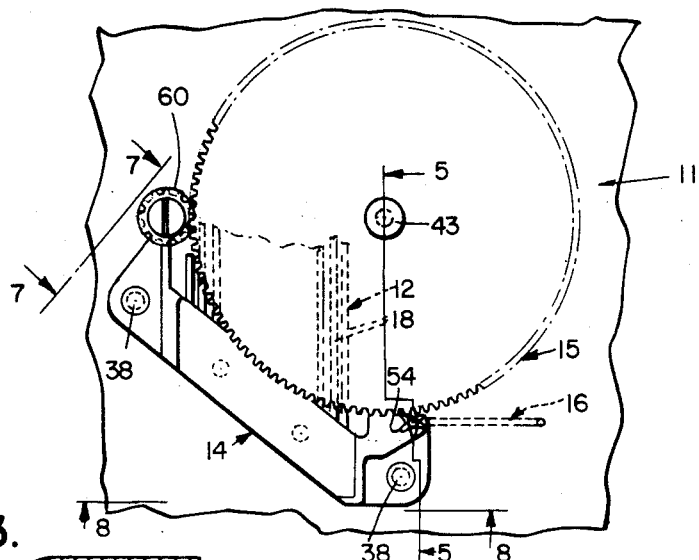
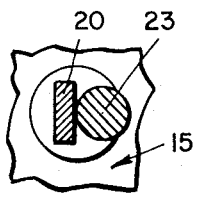
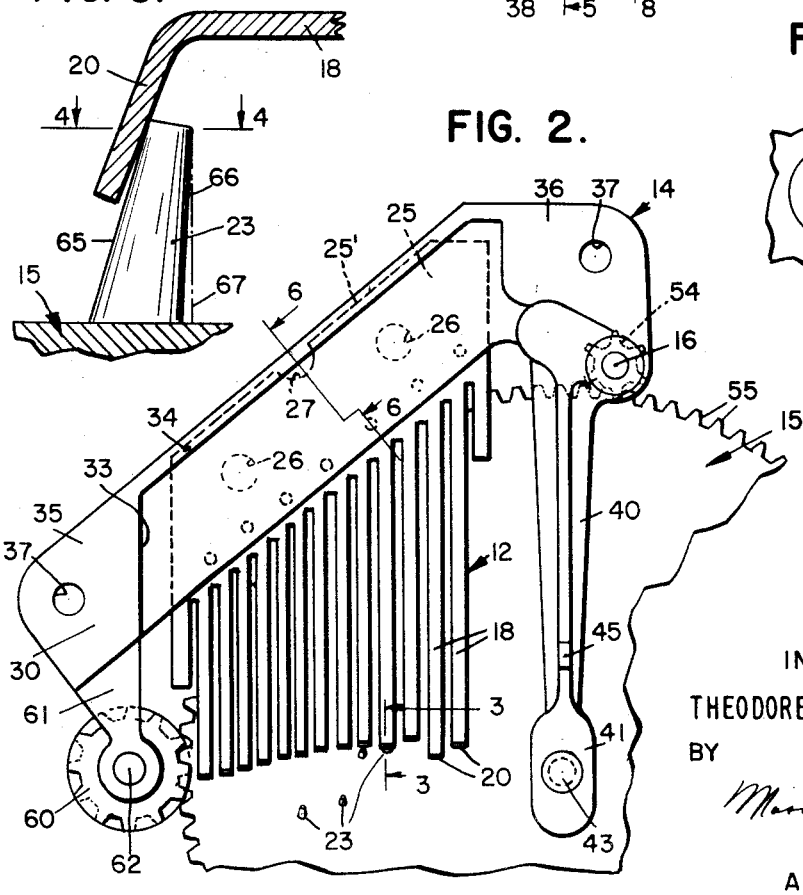
INVENTOR
THEODORE R. DUNCAN
BY
*Mason & Graham*
ATTORNEYS Oct. 18, 1960     T. R. DUNCAN     2,956,466
DRIVE AND GUIDING MEANS FOR DISK ACTUATED MUSIC COMB
Filed July 22, 1955          3 Sheets-Sheet 2

INVENTOR
THEODORE R. DUNCAN
BY
*Mason & Graham*

ATTORNEYS

Oct. 18, 1960     T. R. DUNCAN     2,956,466
DRIVE AND GUIDING MEANS FOR DISK ACTUATED MUSIC COMB
Filed July 22, 1955     3 Sheets-Sheet 3
FIG. 12.
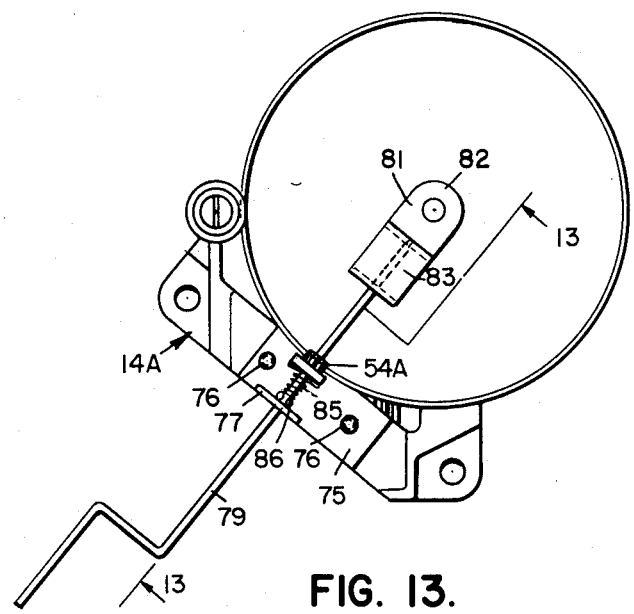
FIG. 16.
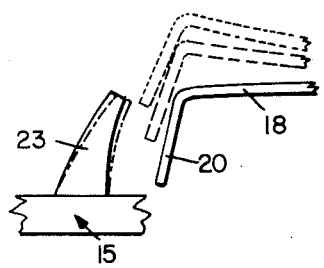
FIG. 13.
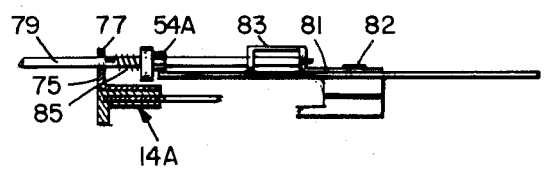
FIG. 14.     FIG. 15.
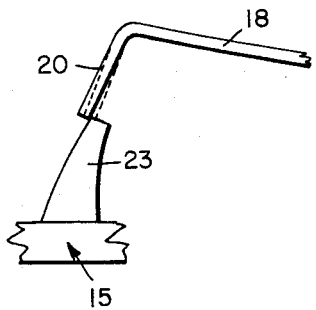 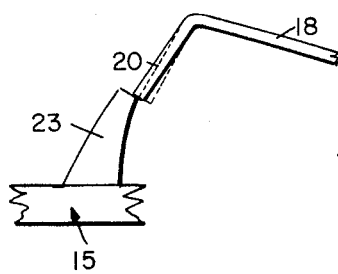
INVENTOR
THEODORE R. DUNCAN
BY
   *Mason & Graham*
ATTORNEYS United States Patent Office 2,956,466
Patented Oct. 18, 1960

2,956,466

DRIVE AND GUIDING MEANS FOR DISK ACTUATED MUSIC COMB

Theodore R. Duncan, North Hollywood, Calif., assignor to Mattel Incorporated

Filed July 22, 1955, Ser. No. 533,143

4 Claims. (Cl. 84—97)

This invention has to do with music devices embodying a music comb and means for plucking or actuating the vibrator teeth of the comb.

An object of the invention is to provide a new and improved music device of the type used in music boxes and more particularly a device embodying a music comb having elongated vibrator teeth with angularly disposed end portions and a rotatable disk having projections thereon for engaging and plucking the teeth of the comb.

Another object is to provide a novel and improved type of music comb.

Still another object is to provide a comb actuating member in the form of a plucking disk having flexible plucking projections or pluckers of novel form designed to permit of the free escape of the vibrators after they have been deflected. Another object in this connection is to provide a plucking disk which is quite in operation and is durable.

A further object is to provide a novel and improved integral music comb and base and to provide such a device in which the base is designed to support a rotatable plucking disk and the means for rotating the disk.

Another object is to provide a device of the type indicated which employs a flexible plucking disk and novel means for holding required portions of the disk in proper relation to the music comb vibrators. In this connection it is an object to provide a novel form of gear wheel of semi-shrouded type.

A further object is to provide novel, non-reversible drive means for imparting rotation to the plucking disk in one direction only.

A still further object is to provide a device which can be relatively inexpensively manufactured, being suitable for mass production methods, and yet possesses superior musical quality.

These and other objects will be apparent from the drawings and the following description. Referring to the drawings:

Fig. 1 is a plan view of a device embodying the invention;

Fig. 2 is an inverted fragmentary plan view on a larger scale of the device of Fig. 1 with the sound diaphragm removed;

Fig. 3 is a greatly enlarged fragmentary sectional view on line 3—3 of Fig. 2;

Fig. 4 is a sectional view on line 4—4 of Fig. 3;

Fig. 12 is a fragmentary plan view of a modified form of the invention;

Fig. 13 is a section on line 13—13 of Fig. 12; and

Figure 5A:
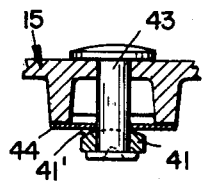
Fig. 5A is a sectional view on line 5A—5A of Fig. 5.

Figs. 14, 15, and 16 are diagrammatic views illustrating the action of a plucker actuating a vibrator tooth.

More particularly describing the invention, 11 generally indicates a sound diaphragm which may be one wall of a box or case and on this is shown mounted a music device embodying the invention and comprising, in general, a music comb 12, a base 14, a plucking disk 15, and a crank 16 for turning the disk. As will later appear, the individual teeth or vibrators 18 of the comb have angularly disposed end portions 20 which project toward the disk 15 and as the disk rotates plucking fingers or pluckers 23 thereon selectively engage, deflect and release the vibrators of the comb.

Figure 9:
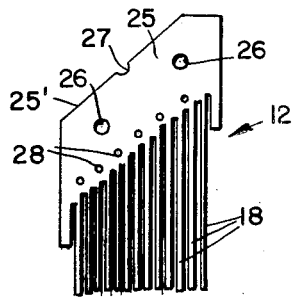
Fig. 9 is a plan view of a music comb element.

One of the features of my invention is the provision of an integral music comb and base with the base acting as a support for the plucking disk and the means for rotating the disk. The comb itself may be made in various ways, but I prefer to form the comb by stamping it from sheet metal and bending the vibrators to produce the inclined end portions 20. The comb should be suitably heat-treated. The resulting product is shown in Fig. 9 and includes a relatively wide base portion 25. This is shown provided with two spaced holes 26 which are for the purpose of receiving locating pins in the die, the base being formed of diecast metal and being cast about the base portion of the comb as will later appear. I also provide one or more recesses 27 at the rear edge of the comb base portion and a plurality of holes 28 adjacent the ends of the vibrators 18 through which the cast metal of the base extends and bonds. These holes should be provided at least in sufficient number to locate one at the end of alternate slots between the vibrators so that when the base is cast about the comb, the discast metal will fill these holes bonding therethrough from side to side of the comb and thereby firmly anchor the comb whereby each vibrator will be bound at least on one side by the discast metal. The purpose of the recess 27 is to provide for the diecast metal extending through the comb at the rear edge and providing a firm grip in this region. Also, the rear edge 25' of the comb is inset within the base as shown in Fig. 2.

The base 14 includes a main portion 30, which is cast about the base of the comb and through recess 27 and holes 28 therein. The under surface of portion 30 is recessed at 33 to reduce the mass. Beyond the recessed area is a continuous rib 34 which extends between end portions 35 and 36. The under surface area 34', 35', 36' is formed to be slightly convex from end to end of the base and is designed to be secured tightly against the sound diaphragm 11. The end portions of the base are apertured at 37 to receive fasteners, such as rivets 38.

Extending from one end of the main portion of the base and forming an acute angle therewith is an arm 40 which terminates in an apertured boss 41 for the purpose of rotatably mounting the plucking disk 15. The latter is shown secured for rotation thereon by rivet 43, a washer 44 being interposed between the parts. The arm 40 is elevated with respect to the level of the surfaces 34', 35' and 36' of the base except for a foot portion 45 which extends downwardly to bear against the diaphragm so that the arm acts as a sound post.

For the purpose of rotating the disk I provide a crank 16 which is shown as a wire 47 bent to appropriate shape.

The wire is journaled in bore 48 of the base and is provided with ears 49 struck from the body of the wire to hold it in place, suitable washers 51 and 52 being provided. Rotatable on the upper end of the wire is a pinion 54 which meshes with teeth 55 on the periphery of the disk 15. The lower portion 54' of the pinion is enlarged to extend under the disk and the under surface is formed with a pair of shoulders 55 connected by inclined surfaces 56. These are so disposed that upon rotation of the crank in a clockwise direction, the ears 50 of the wire engage shoulders 55 and rotate the pinion. However, in the event the crank is turned counterclockwise, no rotative motion is imparted to the pinion if the disk offers resistance to rotation as by one of the pluckers striking an end of a vibrator, since the portions 50 of the wire merely ride up the inclined surfaces of the pinion forcing it and the plucking disk axially of the crank. In this connection, it may be pointed out that the disk 15 is preferably made of a plastic which is stiffly pliant and resilient and possesses sufficient flexibility to permit of the aforesaid axial movement of pinion 54. The disk may be made of high impact styrene, cellulose acetate, butyrate, or vinyl, and many other materials. The material should be self-healing, abrasion-resistant and stiffly pliable.

Figure 5:
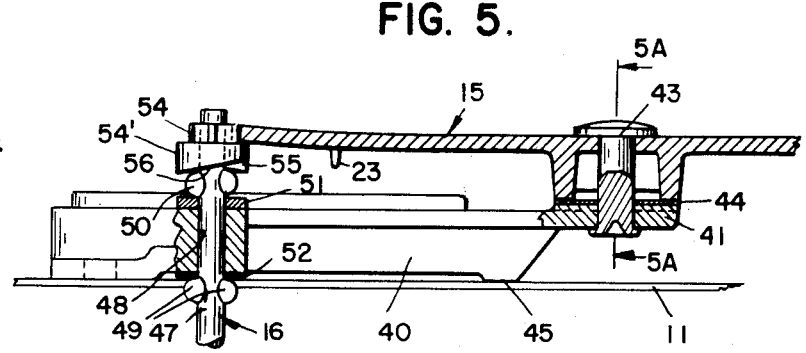
Fig. 5 is an enlarged sectional view on line 5—5 of Fig. 1.
Figure 6:
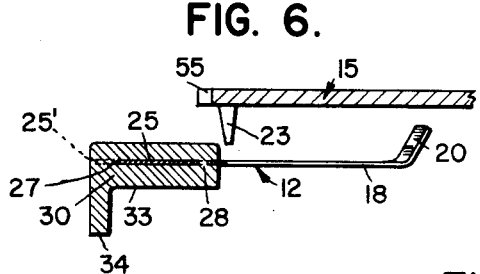
Fig. 6 is a fragmentary sectional view on line 6—6 of Figs. 1 and 2.
Figure 7:
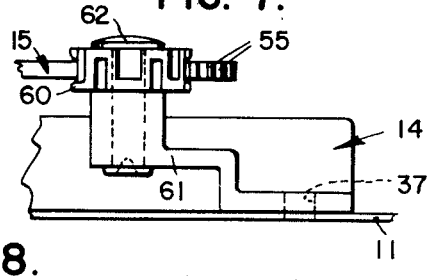
Fig. 7 is an enlarged fragmentary elevational view on line 7—7 of Fig. 1.
Figure 8:
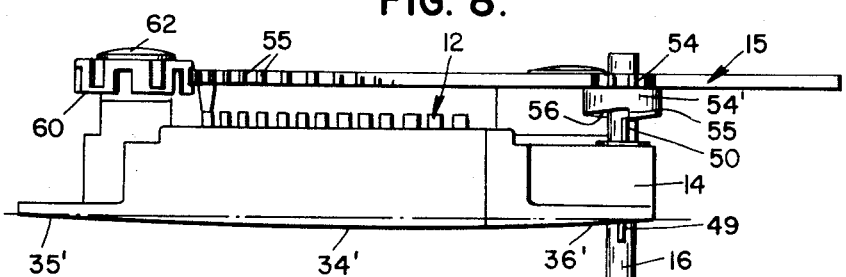
Fig. 8 is an enlarged elevational view on line 8—8 of Fig. 1.

I utilize the inherent flexibility and springiness of the disk to cause it to yieldably bear down against the drive pinion 54 by slightly springing the disk in this region as shown in Fig. 5. The amount of deflection of the disk can be adjusted by selecting washers 51 and 44 of appropriate relative thickness. The slightly sprung disk insures a positive drive.

Since the disk 15 is flexible, it is necessary to support it in the region of the ends of the music comb vibrators to hold it against being deflected away from the vibrators as the pluckers engage the vibrators, and to accomplish this, I provide a guide pinion 60 at one end of the base upon extension 61 thereof. A rivet 62 is used to rotatably secure the pinion. This pinion may be formed with alternate pairs of teeth on opposite sides of the gear shrouded, as shown, or it may be completely shrouded. The advantage of using a shrouded pinion as a guide is that this insures that the guide will readily turn with the disk, reducing friction. If the pinion is semishrouded by closing the space between teeth alternately at opposite sides as shown, the pinion may be molded in one piece.

By adjusting the height of the guide pinion by using washers thereunder of selected thickness I can adjust the spacing of the disk relative to the vibrators, particularly those nearest the periphery of the disk. To facilitate this, the boss 41 at the end of the arm is provided with a laterally rounded or convex surface 41' as shown in Fig. 5A.

As previously indicated, the plucking disk is provided with a plurality of plucking fingers or pluckers 23 and these are disposed in concentric paths about the axis of rotation of the disk in the required pattern. As the disk is rotated the pluckers selectively actuate the vibrator teeth 18 of the comb. These preferably have their bent end portions 20 disposed at about an angle of 70° to the plane of the remaining portions of the comb. The pluckers may be of various cross-sectional shapes, however, referring to Figs. 3 and 4, I show a plucker 23 which is conoidal-shaped and inclined rearwardly from the vertical with respect to the direction of movement of the disk. The longitudinal axis of the plucker is at about 80° to the surface of the disk. The forward surface 65 is thus more nearly vertical than end portion 20 of the vibrator tooth so that when the plucker first engages the vibrator it does so as appears in Fig. 3. In order to insure free escape of the vibrator as it passes over the plucker, I preferably undercut the rear surface 66 of the plucker somewhat, numeral 67 indicating a vertical line adjacent the rear surface.

In Figs. 14–16 I illustrate the action of the plucker actuating a vibrator. The plucker, 23, traveling in the direction of the arrow on the figures, first engages the vibrator end portion 20 as shown in Fig. 3. As the plucker advances it yields or bends as the vibrator is deflected upwardly and bent somewhat under the pulling action thereon as shown in Fig. 14. The end of the vibrator then rides across the top of the plucker to reach the position of Fig. 15 which shows the parts just prior to release of the vibrator, the pressure of the vibrator being toward the plucker. As the plucker advances from this position the vibrator is released to escape toward the disk body in the first half-cycle of its vibratory movement. Fig. 16 illustrates the escape wherein broken lines indicate the positions of the parts prior in time to the full-line positions. At the moment of escapement the plucker springs forward out of the way of the vibrator and the latter, which has been bent forward slightly, springs backward to clear the plucker as it moves toward the disk.

As previously pointed out, I prefer to undercut the rear surface of the pluckers to insure clean escapement, and by so doing the flexibility or resiliently pliant character of the plucker is less critical than otherwise. However, as appears from Figs. 14–16 and the above description thereof, where the pluckers have sufficient flexibility and resiliency, it is unnecessary to undercut the rear surface due to the forward spring of the plucker.

Figure 10:
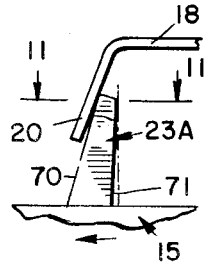
Fig. 10 is a view similar to Fig. 3 but showing an alternate form of plucker.
Figure 11:
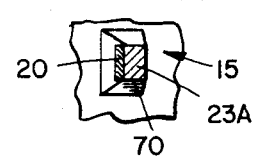
Fig. 11 is a section on line 11—11 of Fig. 10.

I contemplate that the pluckers may take other forms than that previously described and one such other form is shown in Figs. 10 and 11. In these figures the plucker, designated 23A, comprises a rearwardly inclined, truncated, pyramidal body 70 disposed at the same angle as plucker 23. The rear surface 71 is preferably undercut somewhat as shown.

In Figs. 12 and 13 I show a modification of the invention utilizing the same base, music comb, disk and guide means but employing a different form of drive. A bracket 75 is secured to the base 14A by suitable rivets 76. The bracket has an upstanding wall 77 which serves to journal a crank 79. A second bracket, 81, is mounted at the center of the disk by a rivet 82. The second bracket has an inverted box section 83 journaling the inner end of the crank. A pinion 54A, similar to pinion 54 previously described, is rotatably mounted on the crank. The pinion is driven by a coil spring 85 one end of which rides against the pinion and the other end of which is driven by ears 86 formed on the crank. It will be apparent that with this construction the disk is driven only when the crank is rotated clockwise.

Although I have illustrated and described a preferred form of my invention, I contemplate that various changes and modifications can be made therein without departing from the invention, the scope of which is indicated by the following claims.

I claim:

1. A music device comprising a music comb, a base supporting said comb, said base having a main portion and having an arm extending from one end of the main portion and forming an acute angle therewith, a plucking disk rotatably supported on said arm at the outer end thereof and having peripheral gear teeth, a drive pinion supported on said base adjacent the intersection of said main portion and said arm for engagement with said disk, crank means journaled in said base for rotating said drive pinion, and means carried by the other end of the main portion of the base for holding an adjacent portion of said disk against deflection from its normal plane, said last-mentioned means comprising a rotatably mounted shrouded gear meshing with the peripheral gear teeth of said disk.

2. A music device, comprising a music comb, a base supporting said comb, said base having a main portion and having an arm extending from the main portion and forming an acute angle therewith, a plucking disk rotatably supported on said arm at the outer end thereof and having peripheral gear teeth, said disk being resiliently flexible to permit of some axial deflection at its peripheral region, a crank journaled in said base, a drive pinion rotatably carried on said crank engageable with the gear teeth on said disk, said pinion having an enlarged portion between said disk and said base presenting an upwardly facing annular shoulder bearing against the under surface of said disk, and interengaging means on said crank and said pinion for driving said pinion when said crank is rotated in one direction, said means being effective to move said pinion axially upward against the resilient holding force of the disk to effect a nondriving relation between said crank and pinion when the crank is turned in the opposite direction.

3. A music device as set forth in claim 2 in which said pinion is so positioned axially as normally to flex said disk upwardly somewhat whereby the disk serves to yieldably bear down against the pinion.

4. A music device as set forth in claim 2 in which said base is provided with guide means engageable with the peripheral portion of said disk at a region spaced approximately 90° from said drive pinion for holding the engaged portion of the disk against axial deflection.

References Cited in the file of this patent

UNITED STATES PATENTS

| | | |
|---|---|---|
| 267,482 | Boom | Nov. 14, 1882 |
| 359,278 | Parr | Mar. 15, 1887 |
| 550,154 | Bernard | Nov. 19, 1895 |
| 559,773 | Ehrlich | May 5, 1896 |
| 1,072,488 | Nichols | Sept. 9, 1913 |
| 1,309,837 | Black | July 15, 1919 |
| 2,630,655 | Duncan | Mar. 10, 1953 |
| 2,735,328 | Bangs et al. | Feb. 21, 1956 |
| 2,838,834 | Ganine | June 17, 1958 |

FOREIGN PATENTS

| | | |
|---|---|---|
| 392 | Switzerland | June 13, 1902 |
| | (Brevet Addnl. 24,344) | |
| 255,730 | Switzerland | Feb. 1, 1949 |
| 164,281 | Australia | July 22, 1955 |